(12) United States Patent
Liao et al.

(10) Patent No.: US 10,558,114 B2
(45) Date of Patent: Feb. 11, 2020

(54) ILLUMINATION SYSTEM AND PROJECTION APPARATUS HAVING A SMALL VOLUME

(71) Applicant: Coretronic Corporation, Hsin-Chu (TW)

(72) Inventors: Chien-Chung Liao, Hsin-Chu (TW); Chih-Hsien Tsai, Hsin-Chu (TW); Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/261,589

(22) Filed: Jan. 30, 2019

(65) Prior Publication Data

US 2019/0235368 A1    Aug. 1, 2019

(30) Foreign Application Priority Data

Jan. 31, 2018  (CN) .......................... 2018 1 0096388

(51) Int. Cl.
*G03B 21/20* (2006.01)
*G02B 26/00* (2006.01)
(Continued)

(52) U.S. Cl.
CPC ......... *G03B 21/204* (2013.01); *G02B 26/008* (2013.01); *G03B 21/2066* (2013.01); *G03B 21/208* (2013.01); *G03B 33/08* (2013.01)

(58) Field of Classification Search
CPC .. G03B 21/204; G03B 21/28; G02B 27/1026; G02B 26/008; G02B 27/149; F21V 9/08; F21V 7/22
See application file for complete search history.

(56) References Cited

U.S. PATENT DOCUMENTS

| | | | | |
|---|---|---|---|---|
| 5,096,280 A | * | 3/1992 | Hamada | G02B 27/1046 348/E9.027 |
| 8,496,333 B2 | * | 7/2013 | Wang | G02B 26/0833 353/84 |

(Continued)

FOREIGN PATENT DOCUMENTS

| | | |
|---|---|---|
| CN | 202040748 | 11/2011 |
| CN | 102418907 | 4/2012 |

(Continued)

*Primary Examiner* — Tracie Y Green
(74) *Attorney, Agent, or Firm* — JCIPRNET

(57) ABSTRACT

An illumination system including an excitation light source, a transparent substrate, a dichroic film, a first color wheel element and a light uniforming element are provided. The excitation light source emits a first color light. The first color wheel element includes a wavelength conversion material. The first color wheel element has a first side and a second side. The first color light passes through a solid structure of the transparent substrate and the dichroic film, and is transmitted to the first color wheel element and converted into a second color light by the wavelength conversion material. A first part of the second color light is transmitted towards the dichroic film, and is reflected back to the first color wheel element by the dichroic film to enter the light uniforming element. A second part of the second color light passes through the first color wheel element to enter the light uniforming element.

24 Claims, 12 Drawing Sheets

(51) Int. Cl.
*G03B 21/28* (2006.01)
*G02B 27/10* (2006.01)
*G03B 33/08* (2006.01)

(56) References Cited

U.S. PATENT DOCUMENTS

| | | | |
|---|---|---|---|
| 10,156,716 B2* | 12/2018 | Asano | G03B 21/204 |
| 10,379,431 B2* | 8/2019 | Chiu | G03B 33/08 |
| 2019/0235368 A1* | 8/2019 | Liao | G02B 26/008 |

FOREIGN PATENT DOCUMENTS

| | | |
|---|---|---|
| CN | 102563410 | 8/2014 |
| CN | 204593250 | 8/2015 |
| CN | 106324967 | 1/2017 |
| TW | M529190 | 9/2016 |

\* cited by examiner

ILLUMINATION SYSTEM AND PROJECTION APPARATUS HAVING A SMALL VOLUME

CROSS-REFERENCE TO RELATED APPLICATION

This application claims the priority benefit of China application serial no. 201810096388.8, filed on Jan. 31, 2018. The entirety of the above-mentioned patent application is hereby incorporated by reference herein and made a part of this specification.

BACKGROUND OF THE INVENTION

Field of the Invention

The invention relates to an optical system and an optical apparatus, and particularly relates to an illumination system and a projection apparatus.

Description of Related Art

Projection apparatus is a display device used for generating a large-scale image. An imaging principle of the projection apparatus is to convert an illumination light generated by an illumination system into an image light by using a light valve, and then project the image light through a projection lens to form a projection image on a projection target (for example, a screen or a wall).

In order to generate the illumination light of three-primary colors, the illumination system of the projection apparatus includes a color wheel. The color wheel has a light conversion region (for example, a filter region or a wavelength conversion region) and a transmissive region. When a light coming from a light source sequentially passes through the filter region and the wavelength conversion region, the light is respectively converted into a first illumination light (for example, a red illumination light) and a second illumination light (for example, a green illumination light) having a plurality of colors at a first timing and a second timing. When the light coming from the light source passes through a non-light conversion region, the illumination system may provide a third illumination light (for example, a blue illumination light) at a third timing. However, in the known illumination system framework, it is required to provide additional optical elements to transmit the light passing through the non-light conversion region, which causes a problem of an excessively large volume.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to an illumination system and a projection apparatus, which have a small volume.

The invention provides an illumination system including an excitation light source, a transparent substrate, a dichroic film, a first color wheel element and a light uniforming element. The excitation light source is configured to emit a first color light, and the first color light is an excitation light. The transparent substrate is disposed in a transmission path of the first color light. The dichroic film is disposed on the transparent substrate. The first color wheel element includes at least one wavelength conversion material. The first color wheel element has a first side and a second side opposite to each other, where the transparent substrate and the dichroic film are disposed at the first side of the first color wheel element, and the light uniforming element is disposed at the second side of the first color wheel element. The first color light passes through an solid structure of the transparent substrate and the dichroic film, and is transmitted to the first color wheel element, and is converted into a second color light by the at least one wavelength conversion material of the first color wheel element. A first part of the second color light is transmitted towards the dichroic film, and is reflected back to the first color wheel element by the dichroic film to enter the light uniforming element. A second part of the second color light passes through the first color wheel element and is transmitted to the light uniforming element.

The invention provides a projection apparatus including the aforementioned illumination system, a light valve and a projection lens. The illumination system is configured to provide an illumination light, and the illumination light includes the first color light and at least a part of the second color light. The light valve is configured to receive the illumination light, and converts the illumination light into an image light. The projection lens is disposed in a transmission path of the image light.

According to the above description, in the projection apparatus and the illumination system of the invention, at the first timing, the first color light passes through the transparent substrate and the dichroic film, and is transmitted to the wavelength conversion material of the first color wheel element, and is converted into the second color light by the wavelength conversion material, and a first part of the second color light is transmitted towards the dichroic film, and is reflected back to the first color wheel element by the dichroic film to enter the light uniforming element. At the second timing, the first color light passes through the transparent substrate and the dichroic film, and is transmitted to the non-wavelength conversion region of the first color wheel element, and the first color light passes through the non-wavelength conversion region of the first color wheel element and maintains its original color to enter the light uniforming element. In other words, the first color light and the second color light are transmitted to the same light uniforming element at different timings, so that it is unnecessary to additionally configure an optical component for only transmitting the first color light passing through the first color wheel element. Therefore, the projection apparatus and the illumination system have a small volume, a reduced number of optical components and reduced cost.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention.

Figure 1:
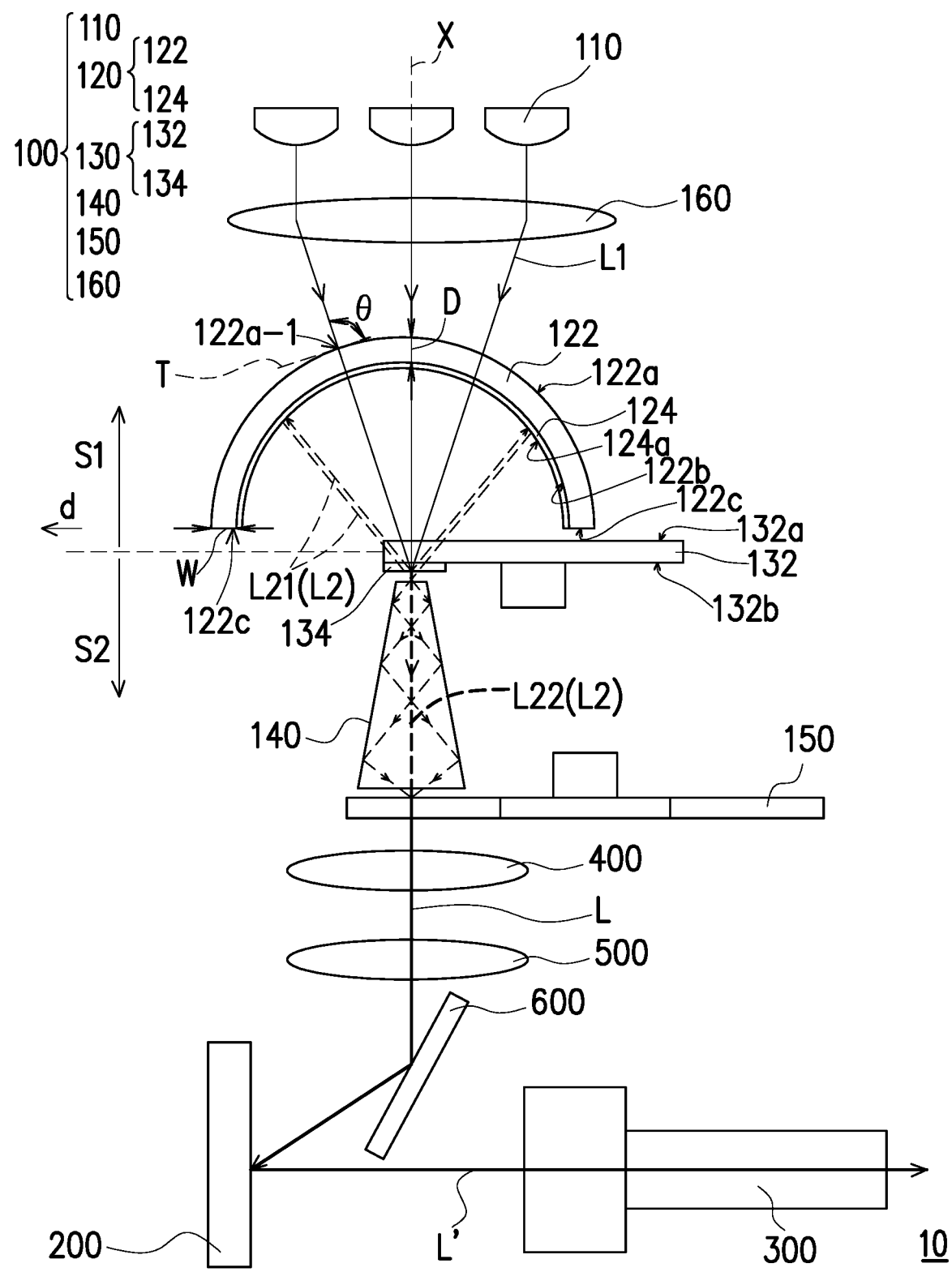
FIG. 1 is a schematic diagram of a projection apparatus according to an embodiment of the invention.

FIG. 1 is a schematic diagram of a projection apparatus according to an embodiment of the invention. Referring to FIG. 1, the projection apparatus 10 includes an illumination system 100, a light valve 200 and a projection lens 300. The illumination system 100 is used for providing an illumination light L, and the illumination light L includes a first color light L1 and at least a part of a second color light L2. The light valve 200 receives the illumination light L from the illumination system 100, and converts the illumination light L into an image light L'. The projection lens 300 receives the image light L' and projects the image light L' to a projection target, for example, a screen or a wall.

In the embodiment, the light valve 200 is for example, a reflective optical modulator, such as a Liquid Crystal on Silicon panel (LCoS panel), a Digital Micro-mirror Device (DMD), etc. In an embodiment, the light valve 200 may also be a transmissive optical modulator such as a transparent liquid crystal panel, an electro-optical modulator, a magneto-optic modulator, an Acousto-Optic Modulator (AOM), etc. The pattern and type of the light valve 200 is not limited by the invention. Regarding the method that the light valve 200 converts the illumination light L into the image light L', since enough instructions and recommendations for detailed steps and implementation thereof may be learned from common knowledge of the related technical field, detailed description thereof is not repeated.

In the embodiment, the projection lens 300 is, for example, a combination of one or a plurality of optical lenses with a dioptre, and the optical lenses, for example, include various combinations of non-planar lenses such as a biconcave lens, a biconvex lens, a convex-concave lens, a concave-convex lens, a plano-convex lens, a plano-concave lens, etc. In an embodiment, the projection lens 300 may also include a planar optical lens to project the image light L' coming from the light valve 200 to the projection target in a reflective or transmissive manner. The pattern and type of the projection lens 300 are not limited by the invention.

Moreover, in the embodiment, the projection apparatus 10 may selectively include light converging elements 400, 500 and a reflector 600. The light converging elements 400, 500 and the reflector 600 are used for guiding the illumination light L emitted by the illumination system 100 to the light valve 200. However, the invention is not limited thereto, and in other embodiments, other optical elements may also be applied to guide the illumination light L to the light valve 200.

The illumination system 100 includes an excitation light source 110, a transparent substrate 122, a dichroic film 124, a first color wheel element 130 and a light uniforming element 140. The excitation light source 110 is configured to emit a first color light L1, and the first color light L1 is an excitation light (for example, a blue excitation light). For example, in the embodiment, the excitation light source 110 may be a laser diode or a plurality of laser diodes arranged in an array. In an embodiment, the excitation light source 110 may also be a Light-Emitting Diode (LED), a plurality of LEDs configured in an array, an Organic Light-Emitting Diode (OLED) or a plurality of OLEDs configured in an array. To be specific, the light sources meeting a volume requirement in design may all be applied, and the pattern and the type of the excitation light source 110 are not limited by the invention.

The transparent substrate 122 is disposed in a transmission path of the first color light L1, and the transparent substrate 122 is integral in appearance, and has no notches or holes on a surface thereof. The transparent substrate 122 has a light incident surface 122a, a light emitting surface 122b opposite to the light incident surface 122a and a side surface 122c connected to the light incident surface 122a and the light emitting surface 122b. The light incident surface 122a is close to the excitation light source 110, and the light emitting surface 122b is away from the excitation light source 110. In the embodiment, the light incident surface 122a is, for example, convex surface, and the light emitting surface 122b is, for example, a concave surface, though the invention is not limited thereto. In the embodiment, the light incident surface 122a may be a part of a complete sphere, and the light emitting surface 122b may also be a part of a complete sphere. The excitation light source 110 has a main optical axis X, and a center thickness of the transparent substrate 122 is a distance D between the light incident surface 122a and the light emitting surface 122b in the main optical axis X, and an edge thickness of the transparent substrate 122 is a width W of the side surface 122c of the transparent substrate 122 in a direction d intersected with the main optical axis X (a direction perpendicular to the main optical axis X in the embodiment). In the embodiment, the center thickness (i.e. the distance D) of the transparent substrate 122 may be equal to the edge thickness (i.e. the width W) of the transparent substrate 122; namely, a ratio of the center thickness to the edge thickness may be 1. In other words, in the embodiment, the transparent substrate 122 may be a part of a complete equal-thickness spherical shell. However, the invention is not limited thereto, and in other embodiments, the transparent substrate 122 may also have other implementation, which is described later with reference of other figures.

In the embodiment, the dichroic film 124 is disposed on the transparent substrate 122, and the transparent substrate 122 and the dichroic film 124 may be regarded as a light guide element 120, where the dichroic film 124 is, for example, a dichroic filter or a dichroic mirror, etc., which is not limited by the invention. The first color light L1 emitted by the excitation light source 110 may passes through the dichroic film 124, and is transmitted to a wavelength conversion material 134 of the first color wheel element 130. The wavelength conversion material 134 is adapted to convert the first color light L1 into the second color light L2, and the dichroic film 124 may reflect the second color light L2, which is described below with reference of FIG. 2 and FIG. 3.

Figure 2:
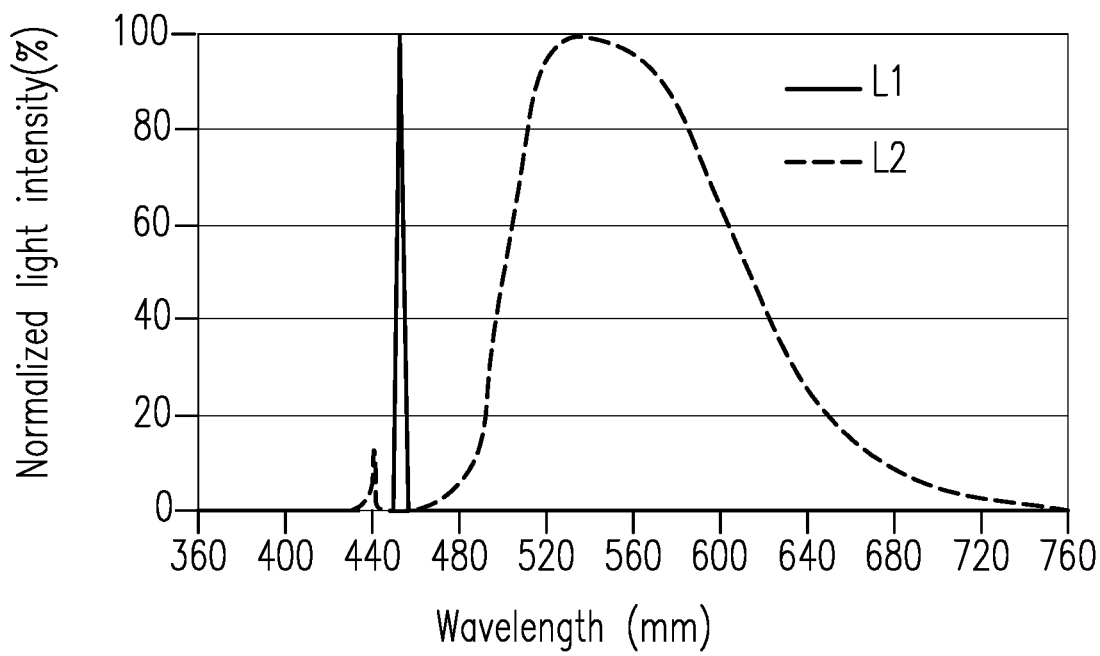
FIG. 2 is a luminescent spectrum of a first color light and a luminescent spectrum of a second color light according to an embodiment of the invention.
Figure 3:
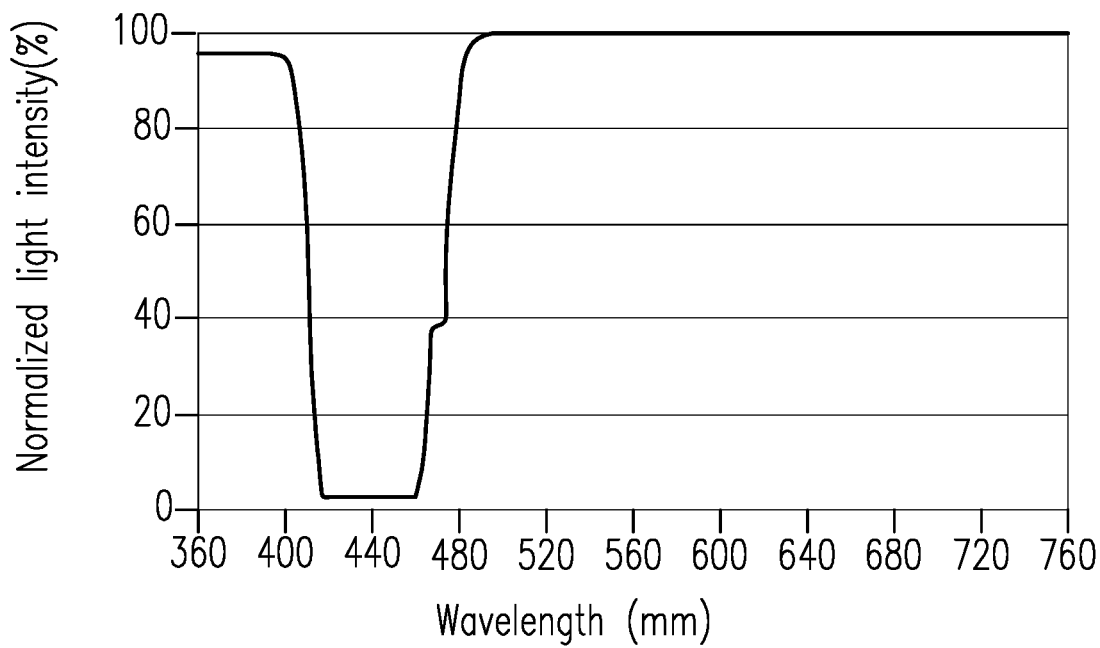
FIG. 3 is a reflection spectrum of a dichroic film according to an embodiment of the invention.

FIG. 2 is a luminescent spectrum of the first color light and a luminescent spectrum of the second color light according to an embodiment of the invention. FIG. 3 is a reflection spectrum of the dichroic film according to an embodiment of the invention. Referring to FIG. 1 and FIG. 2, in the embodiment, a center wavelength of the first color light L1 is 455 nm, i.e. the first color light L1 is a blue light, and a wavelength range of the second color light L2 is 480 nm-700 nm, i.e. the second color light L2 is a yellow light. FIG. 3 illustrates a reflectivity variation curve of the dichroic film 124 relative to the wavelength of the incident light. Referring to FIG. 1 and FIG. 3, in the embodiment, the dichroic film 124 has a reflectivity of near 0% for the first color light L1 belonging to the blue light waveband, i.e. most of the first color light L1 may penetrate through the dichroic film 124; the dichroic film 124 has a reflectivity of near 100% for the second color light L2 belonging to the yellow light waveband, i.e. most of the second color light L2 may be reflected by the dichroic film 124. Based on FIG. 2 and FIG. 3, it is known that the dichroic film 124 is pervious to the first color light L1 and reflects the second color light L2.

Referring to FIG. 1, in the embodiment, the dichroic film 124 is selectively disposed on the light emitting surface 122b of the transparent substrate 122. However, the invention is not limited thereto, and in other embodiments, the dichroic film 124 may be disposed on the light incident surface 122a of the transparent substrate 122 or other proper position, which is described later with reference of other figures.

Referring to FIG. 1, the first color light L1 emitted by the excitation light source 110 sequentially passes through an solid structure of the transparent substrate 122 and the dichroic film 124, and is transmitted to the first color wheel element 130 and converted into the second color light L2 by the wavelength conversion material 134 of the first color wheel element 130. The second color light L2 converted by the wavelength conversion material 134 includes a first part L21 and a second part L22 having different propagation directions. The dichroic film 124 has a first surface 124a facing the wavelength conversion material 134. A part of the second color light L2 propagated towards the dichroic film 124 is the first part L21, the first surface 124a of the dichroic film 124 reflects the first part L21 of the second color light L2 back to the first color wheel element 130, and the first part L21 of the second color light L2 reflected back to the first color wheel element 130 may pass through the first color wheel element 130 to enter the light uniforming element 140. A part of the second color light L2 propagated towards a direction away from the dichroic film 124 is the second part L22, and the second part L22 of the second color light L2 propagated towards the direction away from the dichroic film 124 directly penetrates through the first color wheel element 130 to enter the light uniforming element 140.

In the embodiment, the first surface 124a of the dichroic film 124 may be selectively a spherical surface, and the spherical surface is a part of a complete sphere. In the embodiment, a center of sphere of the spherical surface (i.e. the first surface 124a) may be located on the first color wheel element 130. In detail, the center of sphere may be located on the wavelength conversion material 134 of the first color wheel element 130. In this way, the first part L21 of the second color light L2 reflected by the spherical surface (i.e. the first surface 124a) of the dichroic film 124 may be effectively converged to the first color wheel element 130, so as to increase a light usage rate of the illumination system 100. However, the invention is not limited thereto, and in other embodiments, the first surface 124a may be designed into other proper pattern.

Referring to FIG. 1, in the embodiment, the illumination system 100 may selectively include a light converging element 160. The light converging element 160 is disposed between the excitation light source 110 and the light guide element 120. The light converging element 160 is used for converging the first color light L1 emitted by the excitation light source 110 to the first color wheel element 130. In the embodiment, the transparent substrate 122 may have the light incident surface 122a protruding towards the excitation light source 110. The first color light L1 is incident on a point 122a-1 of the light incident surface 122a, a tangent line T of the light incident surface 122a passing through the point 122a-1 and the first color light L1 have an included angle θ there between, and θ≥70°. In this way, when the first color light L1 passes through the transparent substrate 122, the first color light L1 is not excessively divergent, and is still converged to the first color wheel element 130. Further, the first color light L1 emitted from the excitation light source 110 sequentially passes through the light converging element 160, the transparent substrate 122 and the dichroic film 124 of the light guide element 120, and is converged to the center of sphere of the spherical surface (i.e. the first surface 124a) of the dichroic film 124 or a place near the center of sphere, i.e. the first color light L1 is converged to the wavelength conversion material 134 of the first color wheel element 130 configured at the center of sphere or the place near the center of sphere.

Referring to FIG. 1, the first color wheel element 130 has a first side S1 and a second side S2 opposite to each other. For example, the first side S1 is a space from the first color wheel element 130 to the excitation light source 110, and the second side S2 is a space from the first color wheel element 130 to the reflector 600. The light guide element 120 is disposed at the first side S1 of the first color wheel element 130, and the light uniforming element 140 is disposed at the second side S2 of the first color wheel element 130.

Figure 4:
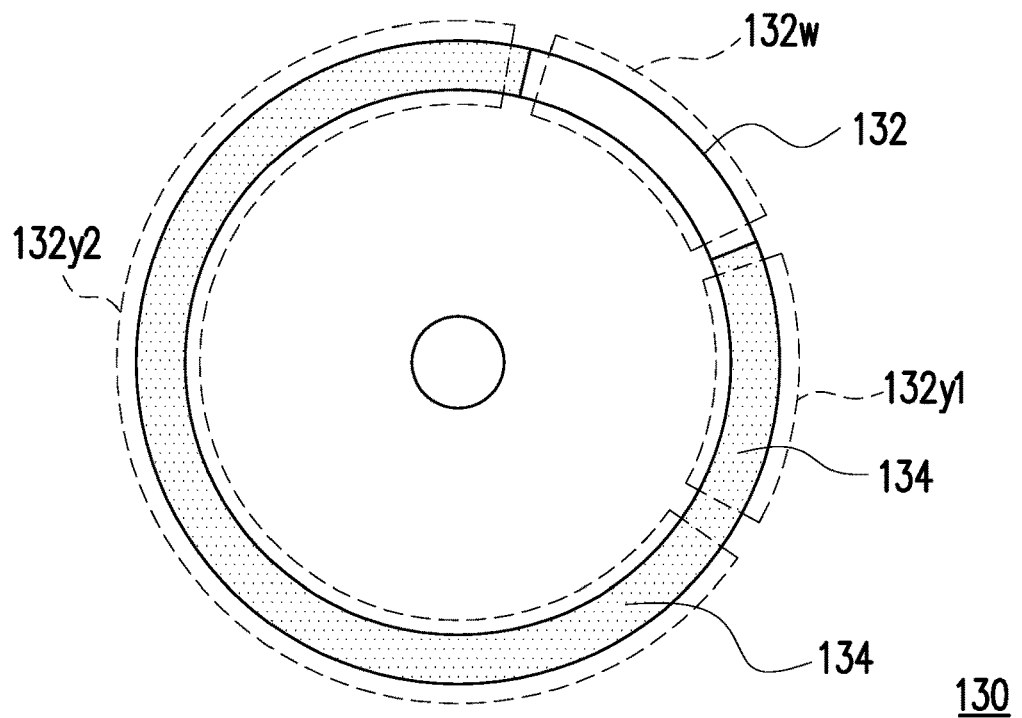
FIG. 4 is a front view of a first color wheel element according to an embodiment of the invention.

FIG. 4 is a front view of the first color wheel element according to an embodiment of the invention. Referring to FIG. 1 and FIG. 4, in the embodiment, the first color wheel element 130 includes a transparent substrate 132 and at least one wavelength conversion material 134. The transparent substrate 132 is, for example, made of a material that is pervious to light such as glass, quartz, etc., and the wavelength conversion material 134 is, for example, phosphor powder adapted to convert the first color light L1 to the second color light L2, or other photoluminescence material adapted to be excited and generate the second color light, which is not limited by the invention. The transparent substrate 132 has at least one wavelength conversion region and at least one non-wavelength conversion region 132w. In the embodiment, the transparent substrate 132 has two wavelength conversion regions 132y1, 132y2, and the wavelength conversion material 134 is disposed on the wavelength conversion regions 132y1, 132y2, and the non-wavelength conversion region 132w is not configured with the wavelength conversion material 134. The wavelength conversion regions 132y1, 132y2 may be configured with the same wavelength conversion material or may be configured with different wavelength conversion materials, which is determined according to an actual design requirement, and is not limited by the invention. In the embodiment, the non-wavelength conversion region 132w is, for example, a hollowed pore or a transparent plate, and the first color light L1 is adapted to directly pass there through. However, in some embodiments, the non-wavelength conversion region 132w may be configured with a diffusion plate, so as to diffuse the first color light L1 penetrating through the non-wavelength conversion region 132w to achieve an effect of light shape adjustment or light spot elimination. Alternatively, the non-wavelength conversion region 132w may also be configured with a transparent plate with a plurality of through holes or a diffusion plate with a plurality of through holes, so as to reduce energy loss of the first color light L1, though the invention is not limited thereto.

It should be noted that the number of the wavelength conversion regions 132y1, 132y2 and the number of the non-wavelength conversion region 132w are only an example and are not used for limiting the invention. In an embodiment, the number of the wavelength conversion regions and the number of the non-wavelength conversion region may also be designed to other numbers according to an actual design requirement.

Referring to FIG. 1, in the embodiment, the transparent substrate 132 has a surface 132a and a surface 132b opposite to each other, where the surface 132a is close to the light guide element 120, and the surface 132b is away from the light guide element 120. In the embodiment, the wavelength conversion material 134 may be selectively disposed on the surface 132b of the transparent substrate 132 that is away from the light guide element 120. However, the invention is not limited thereto, and in other embodiments, the wavelength conversion material 134 may also be selectively disposed on the surface 132a of the transparent substrate 132 that is close to the light guide element 120, or the wavelength conversion material 134 is mixed in the transparent substrate 132.

Referring to FIG. 1, in the embodiment, the illumination system 100 may selectively include a second color wheel element 150. The second color wheel element 150 is disposed on the second side S2 of the first color wheel element 130. The second color wheel element 150 is a filter color wheel.

Figure 5:
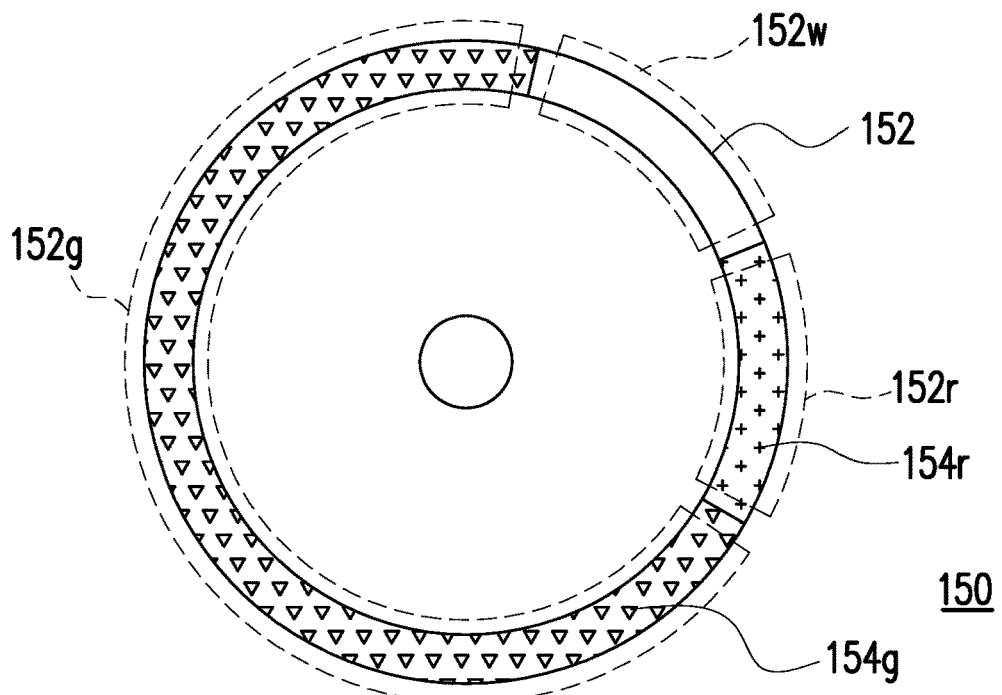
FIG. 5 is a front view of a second color wheel according to an embodiment of the invention.

FIG. 5 is a front view of the second color wheel according to an embodiment of the invention. Referring to FIG. 1 and FIG. 5, in the embodiment, the second color wheel element 150 includes a transparent substrate 152, and the transparent substrate 152 has a filter region 152r, a filter region 152g and a transparent region 152w. The filter region 152r and the filter region 152g are respectively configured with a filter member 154r and a filter member 154g, and the transparent region 152w is not configured with the filter member. For example, in the embodiment, the filter region 152r may be configured with a red filter member 154r, which is pervious to a light of a red waveband and filters lights of other wavebands, and the filter region 152g may be configured with a green filter member 154g, which is pervious to a light of a green waveband and filters lights of other wavebands, and transparent region 152w maintains an original color of the light penetrating there through. In the embodiment, the filter member 154r and the filter member 154g may be respectively a filter material mixed in the filter region 152r and the filter region 152g, or filters disposed on the transparent substrate and respectively corresponding to the filter region 152r and the filter region 152g. The patterns and the numbers of the filter members 154r and 154g are not limited by the invention, and the pattern and the number of the transparent region 152w are also not limited by the invention. In other embodiments, the transparent substrate 152 may also have a filter region pervious to a light of a yellow waveband and filtering lights of other wavebands. Referring to FIG. 1, FIG. 4 and FIG. 5, the second color wheel element 150 may be rotated corresponding to the first color wheel element 130, and the filter region 152r, the filter region 152g of the second color wheel element 150 may correspond to the at least one wavelength conversion region of the first color wheel element 130, and the transparent region 152w of the second color wheel element 150 may correspond to the non-wavelength conversion region 132w of the first color wheel element 130.

Referring to FIG. 1, the light uniforming element 140 is disposed at the second side S2 of the first color wheel element 130. The light uniforming element 140 is used for adjusting a shape of a light spot of the first color light L1 and a shape of a light spot of the second color light L2 and uniforming the first color light L1 and the second color light L2, such that the shape of the light spot of the first color light L1 and the shape of the light spot of the second color light L2 are matched with a shape (for example, a rectangle) of a working region of the light valve 200, so that everywhere of the light spot has a consistent or close light intensity. In the embodiment, the light uniforming element 140 is, for example, an integration rod, though the invention is not limited thereto, and in other embodiments, the light uniforming element may also be other proper type of optical element, which is described later with reference of figures.

In the embodiment, the light uniforming element 140 is selectively disposed between the first color wheel element 130 and the second color wheel element 150, and the light uniforming element 140 may guide the first color light L1 and the second color light L2 passing through the first color wheel element 130 to the second color wheel element 150. However, the invention is not limited thereto, and in other embodiments, the light uniforming element 140 may also be disposed at other proper position, which is described later with reference of figures.

Figure 6:
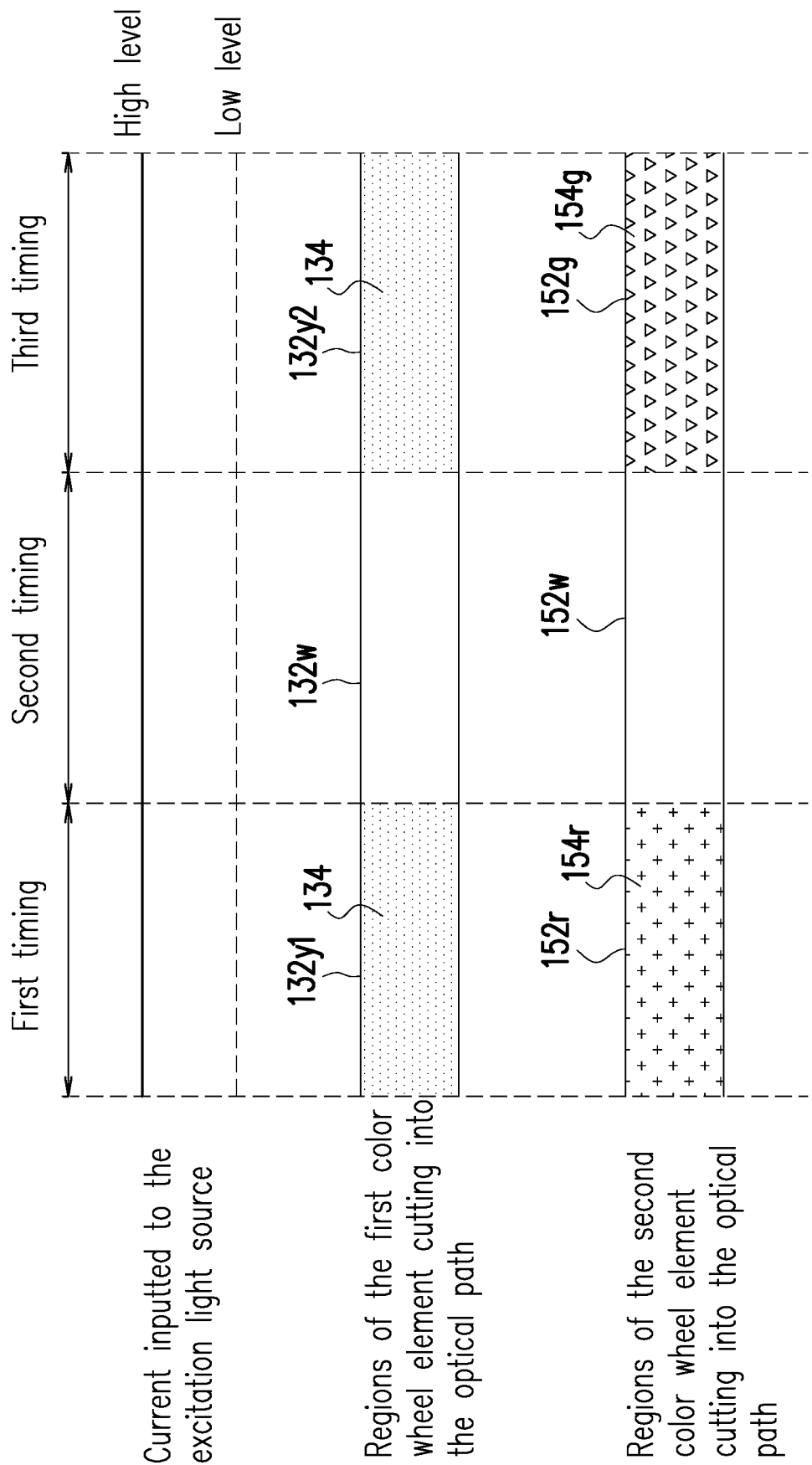
FIG. 6 illustrates currents inputted to an excitation light source, regions of the first color wheel element cutting into an optical path and regions of the second color wheel element cutting into the optical path at different timings according to an embodiment of the invention.

FIG. 6 illustrates currents inputted to the excitation light source, the regions of the first color wheel element cutting into an optical path and the regions of the second color wheel element cutting into the optical path at different timings according to an embodiment of the invention. A process that the projection apparatus 10 provide a projection image is described below with reference of FIG. 1, FIG. 4, FIG. 5 and FIG. 6.

Referring to FIG. 1 and FIG. 6, at a first timing, the current inputted to the excitation light source 110 has a high level, and the excitation light source 110 emits the first color light L1 (for example, the blue light). At the first timing, the wavelength conversion region 132y1 of the first color wheel element 130 is cut into a transmission path of the first color light L1, and the wavelength conversion material 134 disposed on the wavelength conversion region 132y1 converts the first color light L1 into the second color light L2, and the first part L21 of the second color light L2 is propagated towards the dichroic film 124 and is reflected back to the first color wheel element 130 by the dichroic film 124 to penetrate through the first color wheel element 130 and enter the light uniforming element 140, and the second part L22 of the second color light L2 directly passes through the first color wheel element 130 to enter the light uniforming element 140. As shown in FIG. 2, a wavelength range of the second color light L2 emitted from the light uniforming element 140 is substantially between 480 nm and 700 nm, which includes a green light wavelength range of 495 nm to 570 nm, a yellow light wavelength range of 570 nm to 590 nm, an orange light wavelength range of 590 nm to 620 nm and a red light wavelength range of 620 nm to 700 nm. At the first timing, the filter region 152r of the second color wheel element 150 is cut into a transmission path of the second color light L2 emitted from the light uniforming element 140, and after the second color light L2 including the green light, the yellow light, the orange light and the red light wavelength ranges passes through the filter region 152r of the second color wheel element 150, at least a green light component thereof is filtered, and the light with a specific red light wavelength range that passes through the filter region 152r of the second color wheel element 150 may be an illumination red light with good color purity performance, and the illumination red light is one of the components of the illumination light L. At the first timing, the illumination red light is transmitted to the light valve 200, and the light vale 200 converts the illumination red light into a red image light, and the red image light is projected to form a red image on a projection target (for example, a screen or a wall).

Referring to FIG. 1 and FIG. 6, at a second timing, the current inputted to the excitation light source 110 has the high level, and the excitation light source 110 emits the first color light L1 (for example, the blue light). At the second timing, the non-wavelength conversion region 132w of the first color wheel element 130 is cut into the transmission path of the first color light L1, and the first color light L1 passes through the non-wavelength conversion region 132w of the first color wheel element 130 and the light uniforming element 140 and maintains its original color (for example, the blue color). At the second timing, the transparent region 152w of the second color wheel element 150 is cut into the transmission path of the first color light L1 emitted from the light uniforming element 140, and the first color light L1 passes through the transparent region 152w of the second color wheel element 150 and maintains its original color (for example, the blue color). The first color light L1 passing through the transparent region 152w of the second color wheel element 150 may be an illumination blue light, and the illumination blue light is one of the components of the illumination light L. At the second timing, the illumination blue light is transmitted to the light valve 200, and the light vale 200 converts the illumination blue light into a blue image light, and the blue image light is projected to form a blue image on a projection target (for example, a screen or a wall).

Referring to FIG. 1 and FIG. 6, in a third timing, the current inputted to the excitation light source 110 has the high level, and the excitation light source 110 emits the first color light L1 (for example, the blue light). In the third timing, the wavelength conversion region 132y2 of the first color wheel element 130 is cut into the transmission path of the first color light L1, and the wavelength conversion material 134 disposed on the wavelength conversion region 132y2 converts the first color light L1 into the second color light L2, and the first part L21 of the second color light L2 is propagated towards the dichroic film 124 and is reflected back to the first color wheel element 130 by the dichroic film 124 to penetrate through the first color wheel element 130 and enter the light uniforming element 140, and the second part L22 of the second color light L2 directly passes through the first color wheel element 130 to enter the light uniforming element 140. As shown in FIG. 2, a wavelength range of the second color light L2 emitted from the light uniforming element 140 is substantially between 480 nm and 700 nm, which includes a green light wavelength range of 495 nm to 570 nm, a yellow light wavelength range of 570 nm to 590 nm, an orange light wavelength range of 590 nm to 620 nm and a red light wavelength range of 620 nm to 700 nm. In the third timing, the filter region 152g of the second color wheel element 150 is cut into the transmission path of the second color light L2 emitted from the light uniforming element 140, and after the second color light L2 including the green light, the yellow light, the orange light and the red light wavelength ranges passes through the filter region 152g of the second color wheel element 150, at least a red light component thereof is filtered, and the light with a specific green light wavelength range that passes through the filter region 152g of the second color wheel element 150 may be an illumination green light with good color purity performance, and the illumination green light is one of the components of the illumination light L. In the third timing, the illumination green light is transmitted to the light valve 200, and the light vale 200 converts the illumination green light into a green image light, and the green image light is projected to form a green image on a projection target (for example, a screen or a wall).

As described above, the projection apparatus 10 respectively projects the red image, the blue image and the green image to the projection target (for example, a screen or a wall) at the first timing, the second timing and the third timing, and based on visual persistence of human eyes, the red image, the blue image and the green image may construct a required color projection image.

Figure 7:
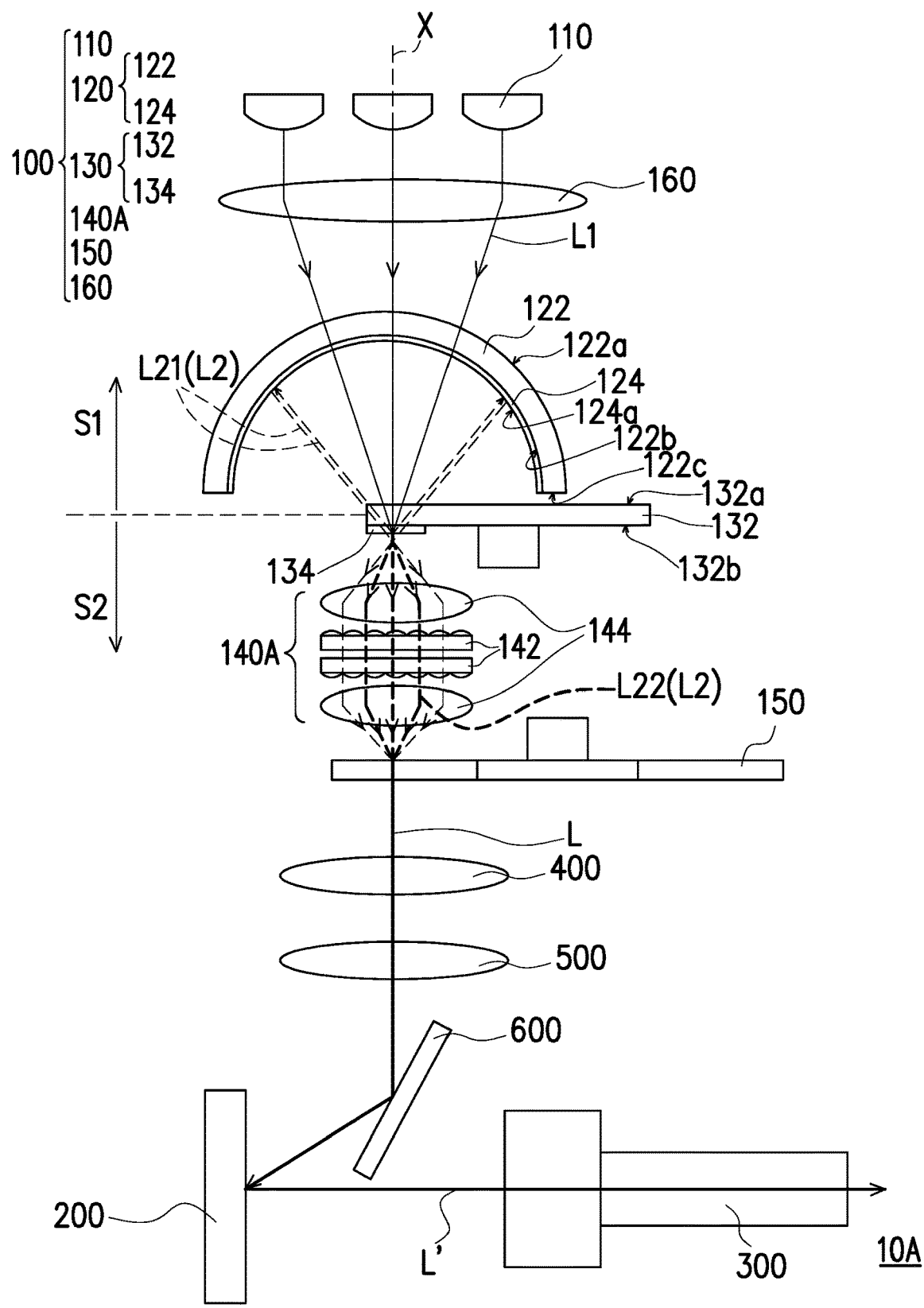
FIG. 7 is a schematic diagram of a projection apparatus according to another embodiment of the invention.

FIG. 7 is a schematic diagram of a projection apparatus according to another embodiment of the invention. Referring to FIG. 1 and FIG. 7, the projection apparatus 10A of FIG. 7 is similar to the projection apparatus 10 of FIG. 1, and a main difference there between is described below, and the same or similar parts of the two projection apparatuses may refer to the aforementioned description, and details thereof are not repeated. The main difference between the projection apparatus 10A and the projection apparatus 10 is that the light uniforming element 140A of the projection apparatus 10A is different to the light uniforming element 140 of the projection apparatus 10. In detail, in the embodiment of FIG. 7, the light uniforming element 140A may include a lens group 144 and a lens array 142 disposed between the lens group 144, such that the first color light L1 and the second color light L2 coming from the first color wheel element 130 sequentially pass through a lens in the lens group 144 that is close to the first color wheel element 130, the lens array 142 and a lens in the lens group 144 that is close to the second color wheel element 150 to enter the second color wheel element 150.

Figure 8:
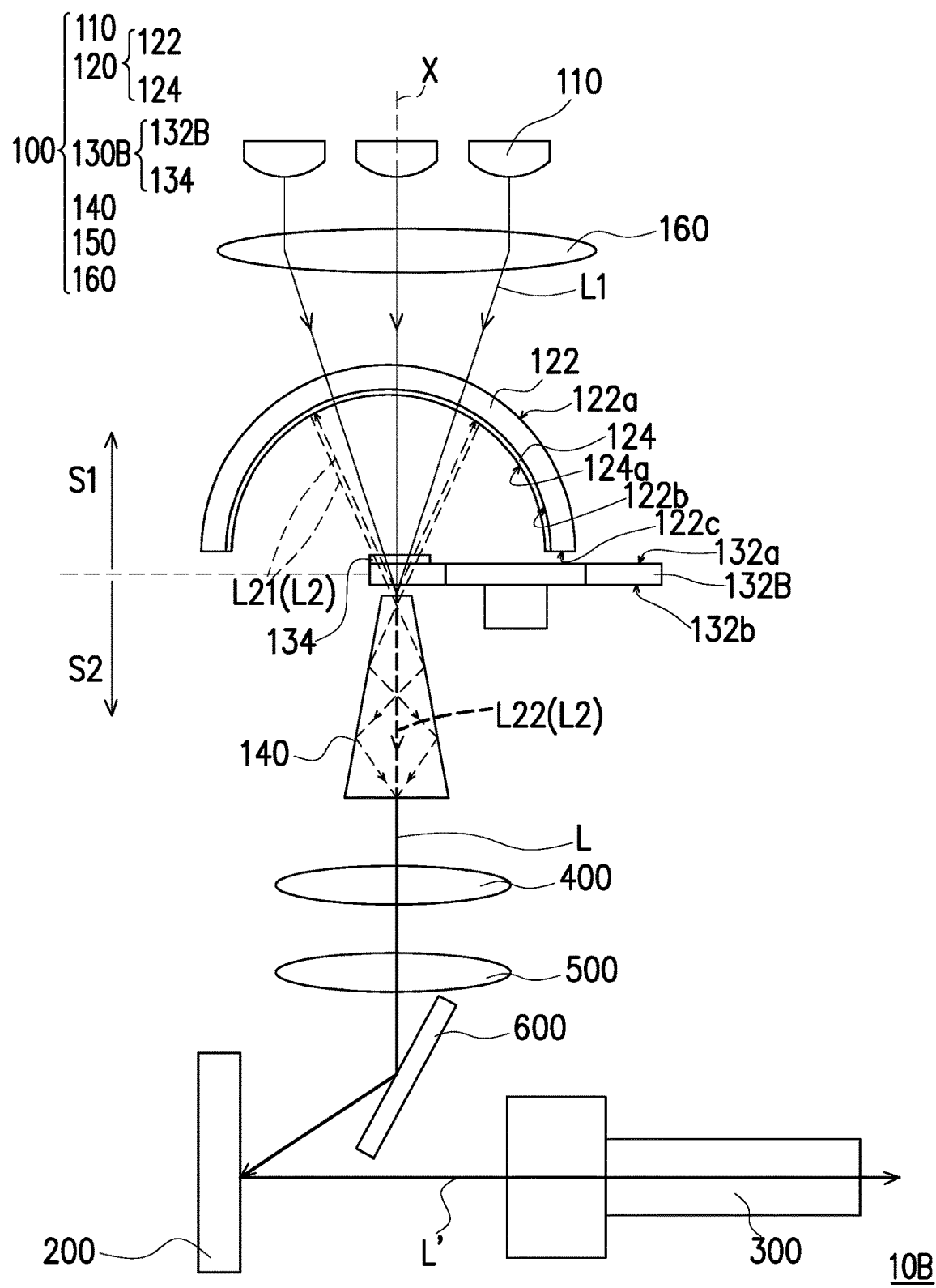
FIG. 8 is a schematic diagram of a projection apparatus according to still another embodiment of the invention.

FIG. 8 is a schematic diagram of a projection apparatus according to still another embodiment of the invention. Referring to FIG. 1 and FIG. 8, the projection apparatus 10B of FIG. 8 is similar to the projection apparatus 10 of FIG. 1, and a main difference between the projection apparatus 10B and the projection apparatus 10 is that the first color wheel element 130B of the projection apparatus 10B is different to the first color wheel element 130 of the projection apparatus 10. The first color wheel element 130B of FIG. 8 is integrated with the wavelength conversion function of the first color wheel element 130 and the filter function of the second color wheel element 150 of FIG. 1, and the projection apparatus 10B of FIG. 8 omits the second color wheel element 150 of FIG. 1. Differences of the two projection apparatuses are described below, and the same or similar parts of the two projection apparatuses may refer to the aforementioned description, and details thereof are not repeated.

Figure 9:
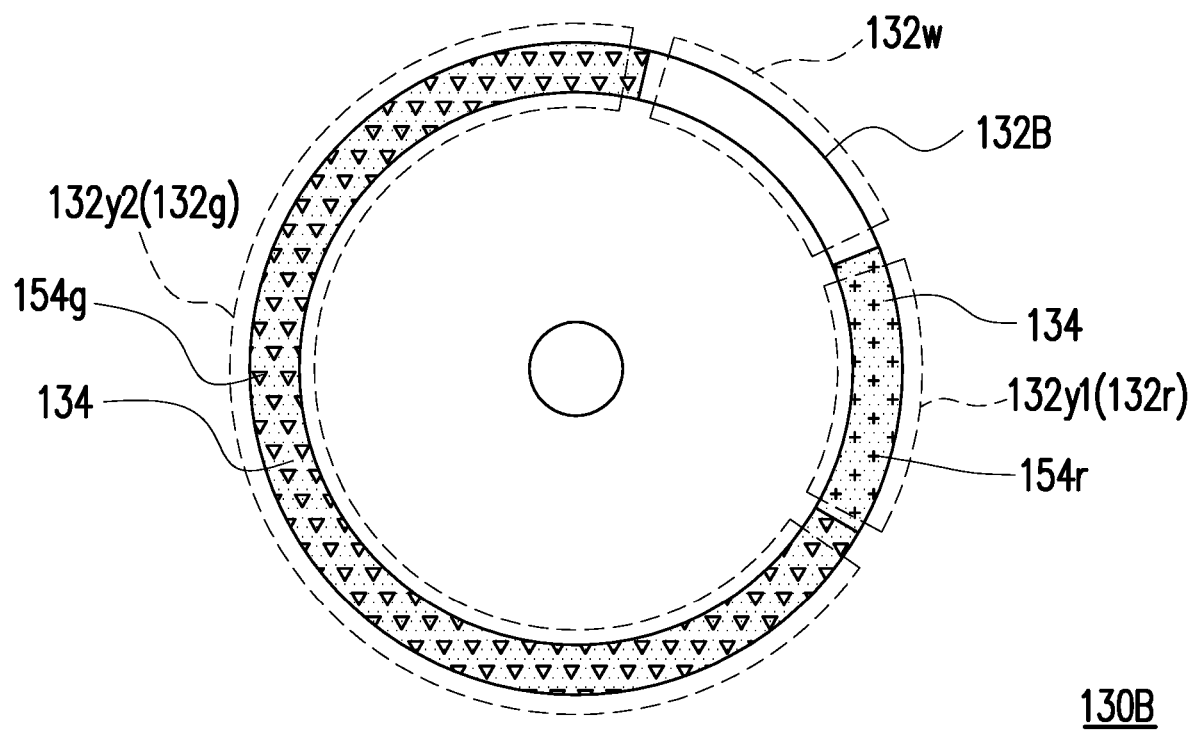
FIG. 9 is a front view of the first color wheel element of FIG. 8.

FIG. 9 is a front view of the first color wheel element 130B of FIG. 8. Referring to FIG. 8 and FIG. 9, in the embodiment, the first color wheel element 130B includes a transparent substrate 132B, and the transparent substrate 132B has a filter region 132r, a filter region 132g and a non-wavelength conversion region 132w. The wavelength conversion material 134 is disposed on the filter region 132r and the filter region 132g of the transparent substrate 132B. The filter region 132r and the filter region 132g are respectively configured with the filter member 154r and the filter member 154g. For example, in the embodiment, the filter region 132r is configured with the red filter member 154r, the filter region 132g is configured with the green filter member 154g, and the non-wavelength conversion region 132w is not configured with the filter member. In the embodiment, the filter member 154r and the filter member 154g may be absorptive filter materials respectively mixed in the transparent substrate 132B, or absorptive filters respectively disposed on the transparent substrate 132B. The light of a specific wavelength range in the second color light L2 coming from the wavelength conversion material 134 passes through the at least one filter regions 132r, 132g of the transparent substrate 132B, and the light having other wavelength of the second color light L2 is absorbed by the filter regions 132r, 132g (i.e. does not penetrate through), which is described in detail below.

At the first timing, the filter region 132r of the first color wheel element 130B is cut into the transmission path of the first color light L1, and the wavelength conversion material 134 disposed on filter region 132r converts the first color light L1 into the second color light L2, and a wavelength range of the second color light L2 converted by the wavelength conversion material 134 is substantially between 480 nm and 700 nm (as shown in FIG. 2), which includes a green light wavelength range of 495 nm to 570 nm, a yellow light wavelength range of 570 nm to 590 nm, an orange light wavelength range of 590 nm to 620 nm and a red light wavelength range of 620 nm to 700 nm. After the second color light L2 passes through the filter region 132r of the first color wheel element 130B, at least a green light component thereof is absorbed, and the light with a specific red light wavelength range that passes through the filter region 132r of the first color wheel element 130B may be an illumination red light with good color purity performance, and the illumination red light is one of the components of the illumination light L.

At the second timing, the non-wavelength conversion region 132w on the first color wheel element 130B that is not configured with the filter material and the wavelength conversion material is cut into the transmission path of the first color light L1, and the first color light L1 passes through the non-wavelength conversion region 132w of the first color wheel element 130B and maintains its original color (for example, the blue color). The first color light L1 passing through the non-wavelength conversion region 132w of the first color wheel element 130B may be an illumination blue light, and the illumination blue light is one of the components of the illumination light L.

In the third timing, the filter region 132g of the first color wheel element 130B is cut into the transmission path of the first color light L1, and the wavelength conversion material 134 disposed on filter region 132g converts the first color light L1 into the second color light L2, and a wavelength range of the second color light L2 converted by the wavelength conversion material 134 is substantially between 480 nm and 700 nm (as shown in FIG. 2), which includes the green light wavelength range of 495 nm to 570 nm, the yellow light wavelength range of 570 nm to 590 nm, the orange light wavelength range of 590 nm to 620 nm and the red light wavelength range of 620 nm to 700 nm. After the second color light L2 passes through the filter region 132g of the first color wheel element 130B, at least a red light component thereof is absorbed, and the light with a specific green light wavelength range that passes through the filter region 132g of the first color wheel element 130B may be an illumination green light with good color purity performance, and the illumination green light is one of the components of the illumination light L.

Figure 10:
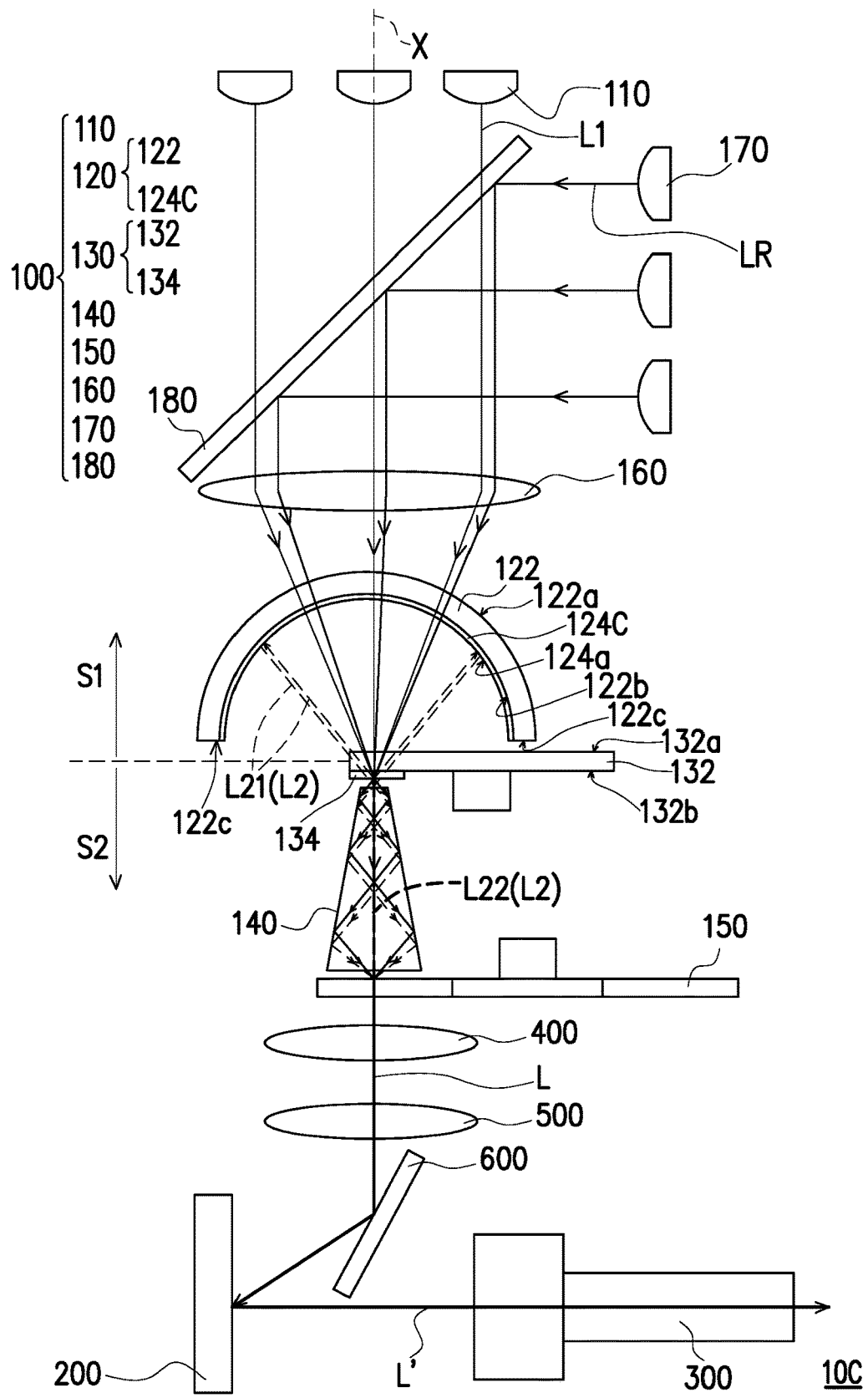
FIG. 10 is a schematic diagram of a projection apparatus according to still another embodiment of the invention.

FIG. 10 is a schematic diagram of a projection apparatus according to still another embodiment of the invention. Referring to FIG. 1 and FIG. 10, the projection apparatus 10C of FIG. 10 is similar to the projection apparatus 10 of FIG. 1, and main differences between the projection apparatus 10C and the projection apparatus 10 are that the projection apparatus 10C further includes an auxiliary light source 170 and a light combination element 180, and the dichroic film 124C of the projection apparatus 10C is also slightly different to the dichroic film 124 of the projection apparatus 10. The main differences there between are described below, and the same or similar parts of the two projection apparatuses may refer to the aforementioned description, and details thereof are not repeated.

Figure 11:
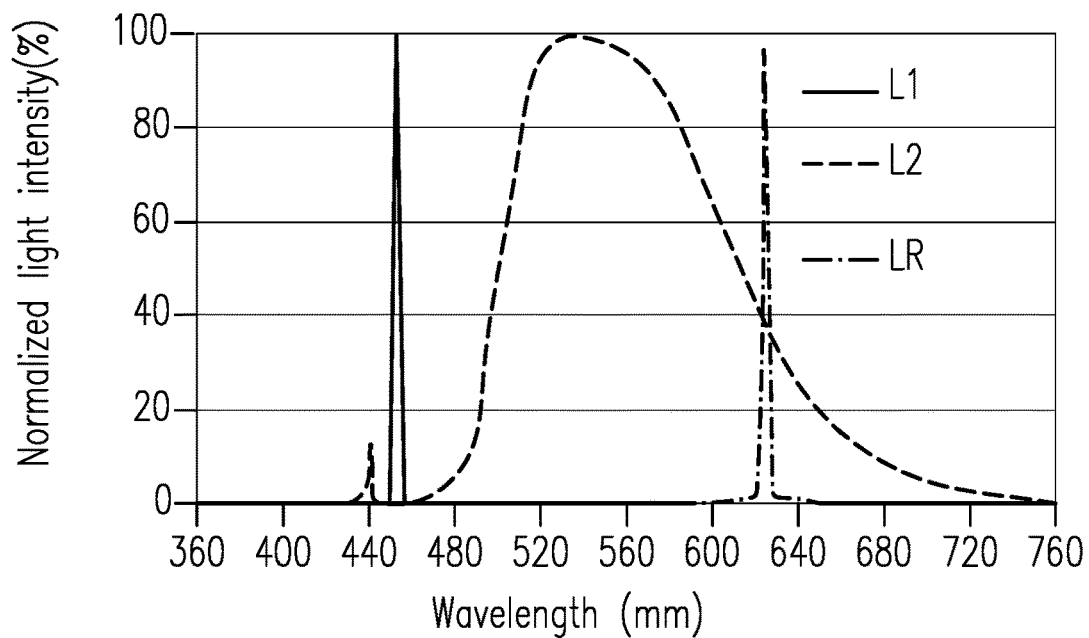
FIG. 11 illustrates a luminescent spectrum of a first color light, a luminescent spectrum of a second color light and a luminescent spectrum of an auxiliary light of FIG. 10.
Figure 12:
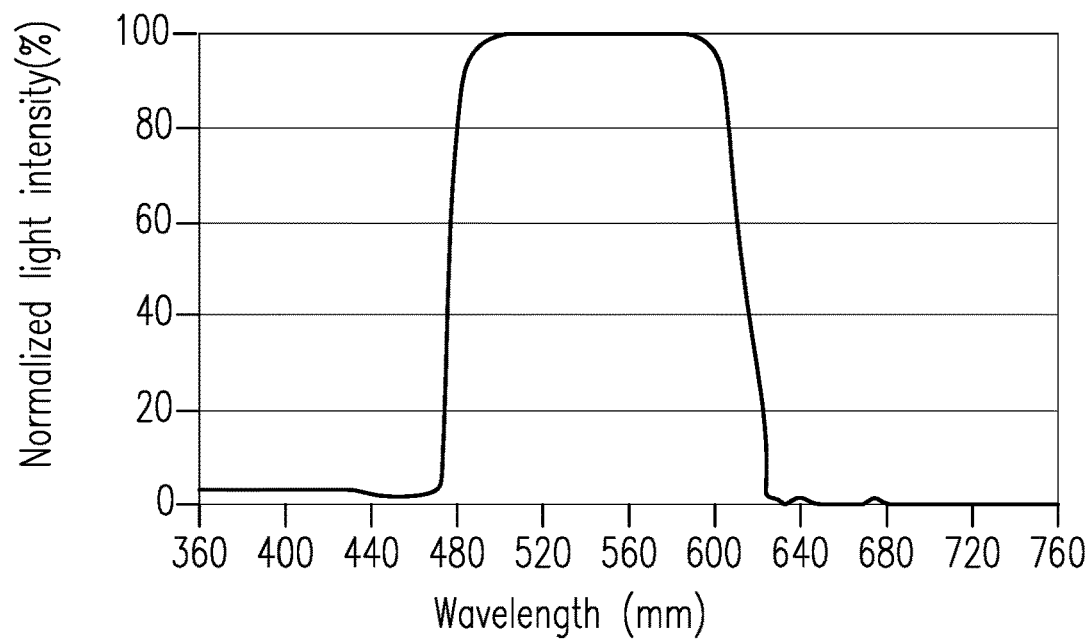
FIG. 12 illustrates a reflection spectrum of a dichroic film of FIG. 10.

FIG. 11 illustrates a luminescent spectrum of the first color light L1, a luminescent spectrum of the second color light L2 and a luminescent spectrum of the auxiliary light LR of FIG. 10. FIG. 12 illustrates a reflection spectrum of the dichroic film 124C of FIG. 10. Referring to FIG. 10, the auxiliary light source 170 is used for emitting the auxiliary light LR, where a wavelength range of the auxiliary light LR is different to the wavelength range of the first color light L1, and the light combination element 180 is, for example, pervious to the first color light L1 and reflects the auxiliary light LR, such that the first color light L1 coming from the excitation light source 110 and the auxiliary light LR coming from the auxiliary light source 170 are combined and propagated towards the light guide element 120. Referring to FIG. 10 and FIG. 11, for example, in the embodiment, a center wavelength of the luminescent spectrum of the auxiliary light LR is, for example, 635 nm. FIG. 12 illustrates a reflectivity variation curve of the dichroic film 124 relative to the wavelength of the incident light. Referring to FIG. 10 and FIG. 12, in the embodiment, the dichroic film 124C, for example, reflects the light with the wavelength range of 480 nm to 625 nm and is pervious to the light of other wavelength ranges. Therefore, the dichroic film 124C has a reflectivity of near 0% for the first color light L1 belonging to the blue light waveband and the auxiliary light LR belonging to the red light waveband, i.e. most of the first color light L1 and the auxiliary light LR may penetrate through the dichroic film 124C; and the dichroic film 124C has a reflectivity of near 100% for the second color light L2 with the wavelength range of 480 nm to 625 nm, i.e. the second color light L2 with the wavelength range of 480 nm to 625 nm is reflected by the dichroic film 124C.

Figure 13:
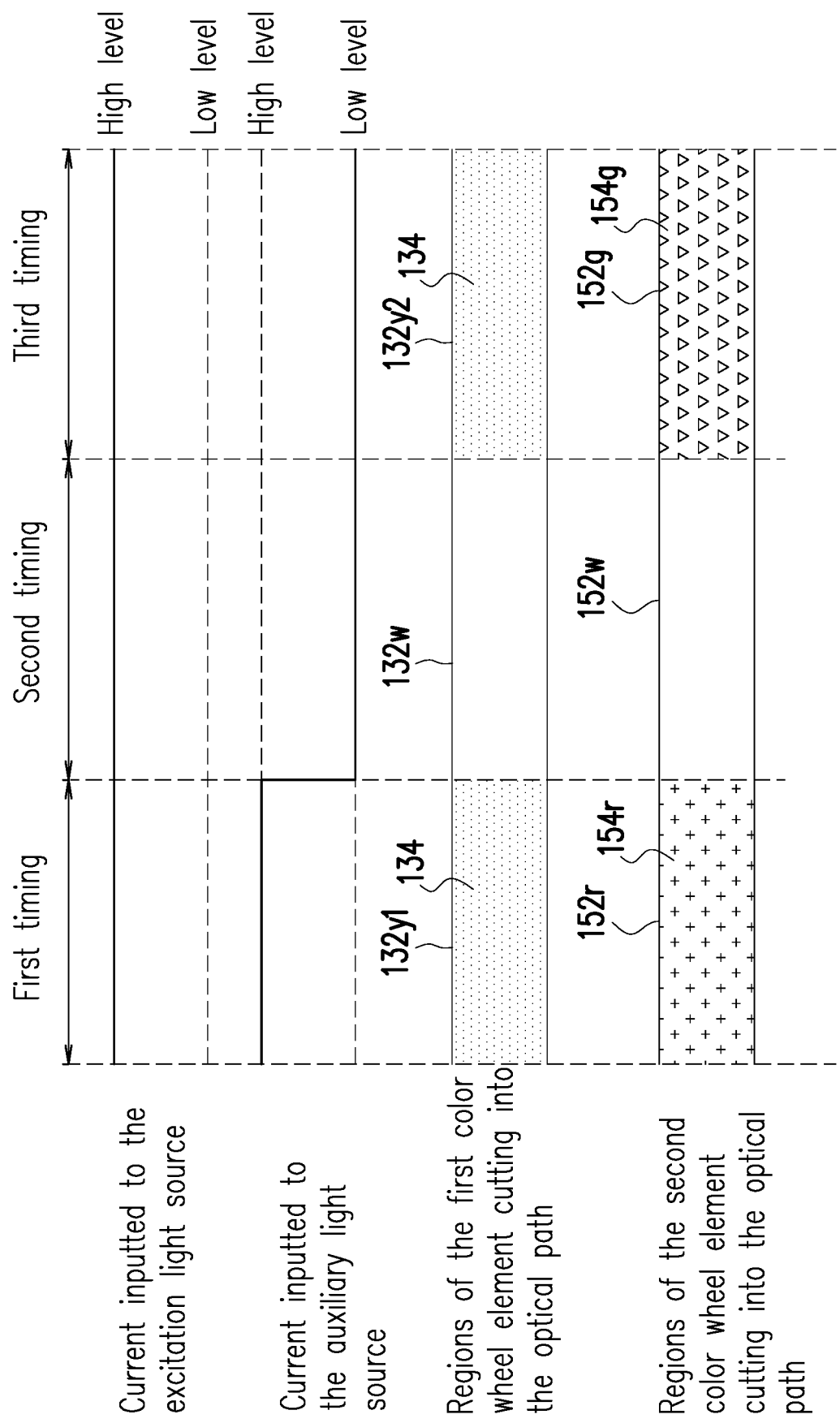
FIG. 13 illustrates currents inputted to an excitation light source, currents inputted to an auxiliary light source, regions of the first color wheel element cutting into an optical path and regions of the second color wheel element cutting into the optical path at different timings according to the embodiment of FIG. 10.

FIG. 13 illustrates currents inputted to the excitation light source 100, currents inputted to the auxiliary light source 170, the regions of the first color wheel element 130 cutting into an optical path and the regions of the second color wheel element 150 cutting into the optical path at different timings according to the embodiment of FIG. 10. A process that the projection apparatus 10C provide a projection image is described below with reference of FIG. 10 and FIG. 13.

Referring to FIG. 10 and FIG. 13, at the first timing, the current inputted to the excitation light source 110 has the high level, and the excitation light source 110 emits the first color light L1 (for example, the blue light). At the first timing, the first color light L1 passes through the light combination element 180, the solid structure of the transparent substrate 122 and the dichroic film 124C, and is transmitted to the wavelength conversion material 134 of the first color wheel element 130 and is converted into the second color light L2. The wavelength conversion region 132y1 of the first color wheel element 130 is cut into the transmission path of the first color light L1, and the wavelength conversion material 134 disposed on the wavelength conversion region 132y1 converts the first color light L1 into the second color light L2, and the first part L21 of the second color light L2 is propagated towards the dichroic film 124C and is reflected back to the first color wheel element 130 by the dichroic film 124C to penetrate through the first color wheel element 130 and enter the light uniforming element 140, and the second part L22 of the second color light L2 directly passes through the first color wheel element 130 to enter the light uniforming element 140. As shown in FIG. 11, a wavelength range of the second color light L2 emitted from the light uniforming element 140 is substantially between 480 nm and 700 nm, which includes a green light wavelength range of 495 nm to 570 nm, a yellow light wavelength range of 570 nm to 590 nm, an orange light wavelength range of 590 nm to 620 nm and a red light wavelength range of 620 nm to 700 nm. At the first timing, the filter region 152r of the second color wheel element 150 is cut into the transmission path of the second color light L2 emitted from the light uniforming element 140, and after the second color light L2 including the green light, the yellow light, the orange light and the red light passes through the filter region 152r of the second color wheel element 150, at least a green light component thereof is filtered, and the light with a specific red light wavelength range that passes through the filter region 152r of the second color wheel element 150 may be a first sub-illumination red light with good color purity performance.

At the first timing, the current inputted to the auxiliary light source 170 also has the high level, and the auxiliary light source 170 is enabled to emit the auxiliary light LR (for example, a red light). The auxiliary light LR is reflected by the light combination element 180 to pass through the solid structure of the transparent substrate 122, the dichroic film 124C, and the wavelength conversion material 134 of the first color wheel element 130 to enter the light uniforming element 140. At the first timing, the filter region 152r of the second color wheel element 150 is cut into a transmission path of the auxiliary light LR coming from the light uniforming element 140, and at least a part of the auxiliary light LR is not filtered by the filter region 152r of the second color wheel element 150, and the auxiliary light LR passing through the filter region 152r of the second color wheel element 150 is a second sub-illumination red light with good color purity performance, and the first sub-illumination red light and the second sub-illumination red light may construct a high-intensity illumination red light, so as to improve color saturation of the projection image.

At the first timing, the high-intensity illumination red light is transmitted to the light valve 200, and the light valve 200 converts the high-intensity illumination red light into a high-intensity red image light, and the high-intensity red image light is projected to form a red image with enough light intensity on a projection target (for example, a screen or a wall).

Referring to FIG. 10 and FIG. 13, at the second timing, the current inputted to the excitation light source 110 has the high level, and the excitation light source 110 emits the first color light L1 (for example, the blue light). At the second timing, the non-wavelength conversion region 132w of the first color wheel element 130 is cut into the transmission path of the first color light L1, and the first color light L1 passes through the solid structure of the transparent substrate 122, the dichroic film 124C, the non-wavelength conversion region 132w of the first color wheel element 130 and the light uniforming element 140 and maintains its original color (for example, the blue color). At the second timing, the transparent region 152w of the second color wheel element 150 is cut into the transmission path of the first color light L1 emitted from the light uniforming element 140, and the first color light L1 passes through the transparent region 152w of the second color wheel element 150 and maintains its original color (for example, the blue color). The first color light L1 passing through the transparent region 152w of the second color wheel element 150 may be an illumination blue light, and the illumination blue light is one of the components of the illumination light L. At the second timing, the illumination blue light is transmitted to the light valve 200, and the light vale 200 converts the illumination blue light into a blue image light, and the blue image light is projected to form a blue image on a projection target (for example, a screen or a wall). At the second timing, the current inputted to the auxiliary light source 170 has a low level, and the auxiliary light source 170 is disabled and does not emit the auxiliary light LR. Configuration of the auxiliary light source 170 does not influence the blue image.

Referring to FIG. 10 and FIG. 13, in the third timing, the current inputted to the excitation light source 110 has the high level, and the excitation light source 110 emits the first color light L1 (for example, the blue light). In the third timing, the wavelength conversion region 132y2 of the first color wheel element 130 is cut into the transmission path of the first color light L1, and the wavelength conversion material 134 disposed on the wavelength conversion region 132y2 converts the first color light L1 into the second color light L2, and the first part L21 of the second color light L2 is propagated towards the dichroic film 124 and is reflected back to the first color wheel element 130 by the dichroic film 124 to penetrate through the first color wheel element 130 and enter the light uniforming element 140, and the second part L22 of the second color light L2 directly passes through the first color wheel element 130 to enter the light uniforming element 140. As shown in FIG. 2, a wavelength range of the second color light L2 emitted from the light uniforming element 140 is substantially between 480 nm and 700 nm, which includes a green light wavelength range of 495 nm to 570 nm, a yellow light wavelength range of 570 nm to 590 nm, an orange light wavelength range of 590 nm to 620 nm and a red light wavelength range of 620 nm to 700 nm. In the third timing, the filter region 152g of the second color wheel element 150 is cut into the transmission path of the second color light L2 emitted from the light uniforming element 140, and after the second color light L2 including the green light, the yellow light, the orange light and the red light passes through the filter region 152g of the second color wheel element 150, at least a red light component thereof is filtered, and the light with a specific green light wavelength range that passes through the filter region 152g of the second color wheel element 150 may be an illumination green light with good color purity performance, and the illumination green light is one of the components of the illumination light L. In the third timing, the illumination green light is transmitted to the light valve 200, and the light vale 200 converts the illumination green light into a green image light, and the green image light is projected to form a green image on a projection target (for example, a screen or a wall). In the third timing, the current inputted to the auxiliary light source 170 has the low level, and the auxiliary light source 170 is disabled and does not emit the auxiliary light LR. Configuration of the auxiliary light source 170 does not influence the green image.

The projection apparatus 10C respectively projects the red image, the blue image and the green image to the projection target (for example, a screen or a wall) at the first timing, the second timing and the third timing, and based on visual persistence of human eyes, the red image, the blue image and the green image may construct a required color projection image. Particularly, due to configuration of the auxiliary light source 170, the brightness of the red image is increased, which avails improving the color saturation of the projection image.

Figure 14:
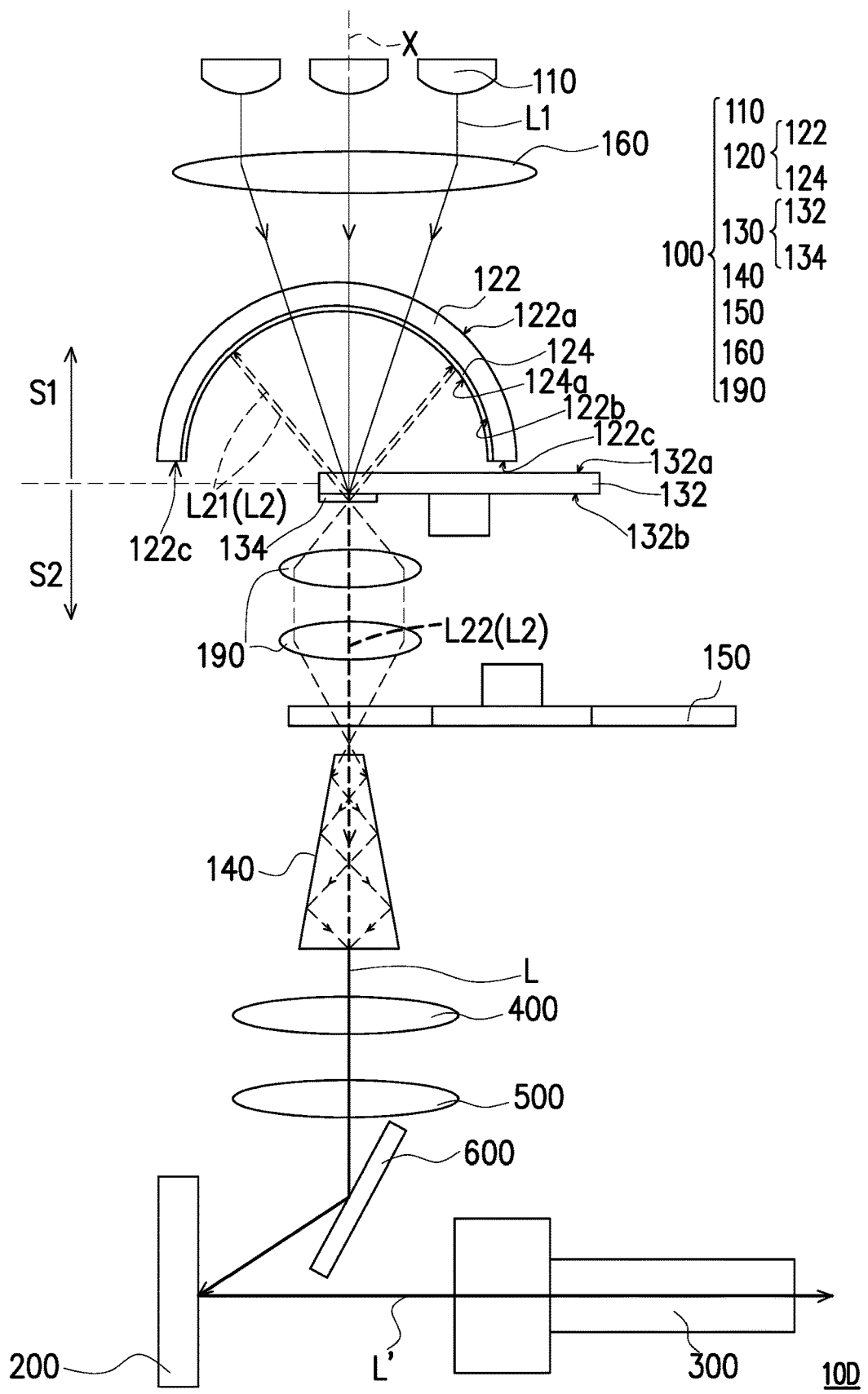
FIG. 14 is a schematic diagram of a projection apparatus according to an embodiment of the invention.

FIG. 14 is a schematic diagram of a projection apparatus according to an embodiment of the invention. Referring to FIG. 1 and FIG. 14, the projection apparatus 10D of FIG. 14 is similar to the projection apparatus 10 of FIG. 1, and a main difference there between is described below, and the same or similar parts of the two projection apparatuses may refer to the aforementioned description, and details thereof are not repeated. The main difference between the projection apparatus 10D and the projection apparatus 10 is that the projection apparatus 10D further includes a lens group 190. The lens group 190 is disposed between the first color wheel element 130 and the second color wheel element 150, and the second color wheel element 150 is located between the lens group 190 and the light uniforming element 140, where the lens group 190 guides the first color light L1 and the second color light L2 passing through the first color wheel element 130 to the second color wheel element 150.

Figure 15:
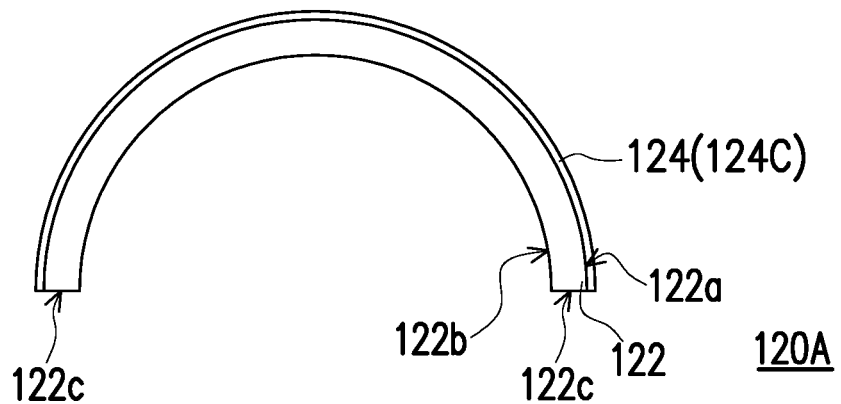
FIG. 15 is a cross-sectional view of a light guide element according to another embodiment of the invention.

FIG. 15 is a cross-sectional view of a light guide element according to another embodiment of the invention. Referring to FIG. 1 and FIG. 15, the light guide element 120A of FIG. 15 is similar to the light guide element 120 of FIG. 1, though the dichroic film 124 (or 124C) of the light guide element 120A is disposed on the light incident surface 122a of the transparent substrate 122.

Figure 16:
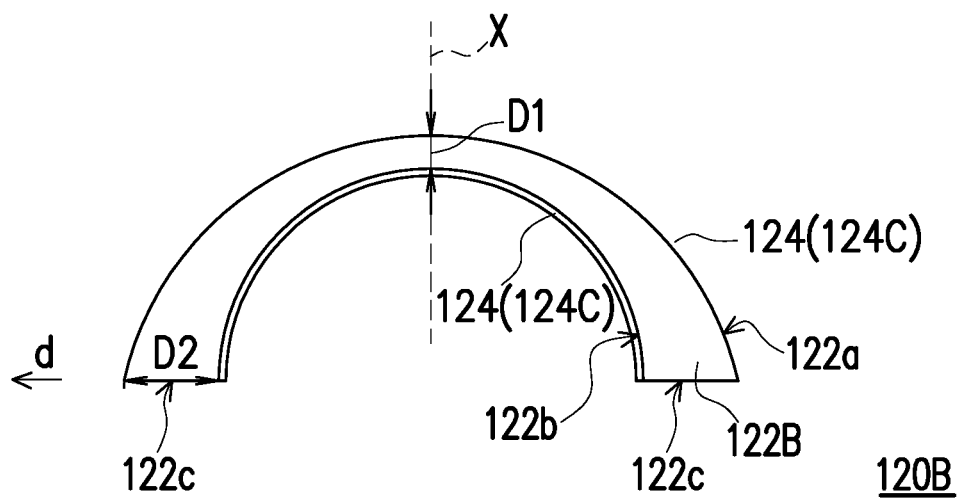
FIG. 16 is a cross-sectional view of a light guide element according to still another embodiment of the invention.

FIG. 16 is a cross-sectional view of a light guide element according to still another embodiment of the invention. Referring to FIG. 1 and FIG. 16, the light guide element 120B of FIG. 16 is similar to the light guide element 120 of FIG. 1, though the transparent substrate 122B of the light guide element 120B is different to the transparent substrate 122 of the light guide element 120 of FIG. 1. In detail, the excitation light source 110 has the main optical axis X, and a center thickness of the transparent substrate 122B is a distance D1 between the light incident surface 122a and the light emitting surface 122b in the main optical axis X, and an edge thickness of the transparent substrate 122C is a width D2 of the side surface 122c of the transparent substrate 122B in a direction d intersected with the main optical axis X (a direction perpendicular to the main optical axis X in the embodiment), and the center thickness (i.e. the distance D1) of the transparent substrate 122B is smaller than the edge thickness (i.e. the width D2). In the embodiment, a ratio of the center thickness to the edge thickness may be greater than or equal to 0.25 and smaller than 1.

Figure 17:
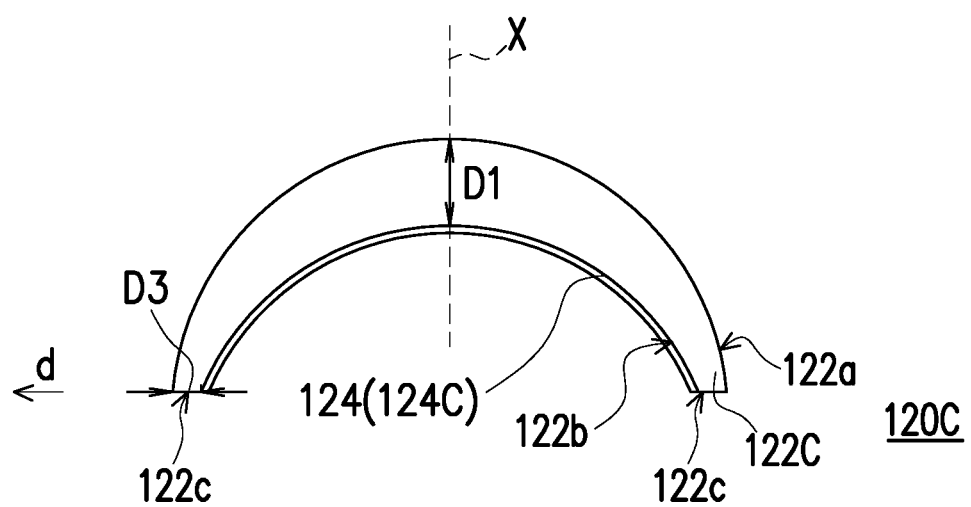
FIG. 17 is a cross-sectional view of a light guide element according to still another embodiment of the invention.

FIG. 17 is a cross-sectional view of a light guide element according to still another embodiment of the invention. Referring to FIG. 1 and FIG. 17, the light guide element 120C of FIG. 17 is similar to the light guide element 120 of FIG. 1, though the transparent substrate 122C of the light guide element 120C is different to the transparent substrate 122 of the light guide element 120 of FIG. 1. In detail, the excitation light source 110 has the main optical axis X, and a center thickness of the transparent substrate 122C is the distance D1 between the light incident surface 122a and the light emitting surface 122b in the main optical axis X, and an edge thickness of the transparent substrate 122C is a width D3 of the side surface 122c of the transparent substrate 122C in the direction d intersected with the main optical axis X (a direction perpendicular to the main optical axis X in the embodiment), and the center thickness (i.e. the distance D1) of the transparent substrate 122C is greater than the edge thickness (i.e. the width D3). In the present embodiment, a ratio of the center thickness to the edge thickness may be greater than 1 and smaller than or equal to 4.

Any one of the light guide elements 120A, 120B, 120C of FIG. 15 to FIG. 17 may be applied to replace the light guide element 120 of any of the projection apparatuses 10, 10A, 10B, 10C, 10D, and the various projection apparatuses formed according to such method are also within a protection range of the invention.

Moreover, a projection apparatus in another embodiment of the invention includes two light valves, and the illumination system is not configured with the second color wheel element, and in the projection apparatus, a first light splitting/combination element is configured between the light uniforming element and the light valve, and a second light splitting/combination element is configured between the light valve and the projection lens. At the first timing, the wavelength conversion region of the first color wheel element is cut into the transmission path of the first color light (for example, a blue light), and the wavelength conversion material disposed on the wavelength conversion region converts the first color light into the second color light (for example, a yellow light), and the second color light passing through the first light splitting/combination element is split into a first waveband light (for example, a red light) and a second waveband light (for example, a green light). The first waveband light and the second waveband light are respectively guided to different light valves by the first light splitting/combination element, and the light valves respectively convert the first waveband light and the second waveband light into a red image light and a green image light, and the red image light and the green image light are combined by the second light splitting/combination element for transmitting to the projection lens. At the second timing, the non-wavelength conversion region that is not configured with the wavelength conversion material on the first color wheel element is cut into the transmission path of the first color light, and the first color light passes through the non-wavelength conversion region, and enters the first light splitting/combination element after passing through the light uniforming element, and the first light splitting/combination element guides the first color light (for example, the blue light) to one of the two light valves. The light valve converts the first color light into a blue image light, and the blue image light is guided to the projection lens by the second light splitting/combination element. In this way, the projection apparatus respectively projects the red image, the green image and the blue image to the projection target (for example, a screen or a wall) at the first timing and the second timing.

In summary, the embodiments of the invention have at least one of the following advantages or effects. In the projection apparatus and the illumination of the embodiments of the invention, at the first timing, after the first color light passes through the solid structure of the transparent substrate and the dichroic film, the first color light is transmitted to the wavelength conversion material of the first color wheel element, and is converted into the second color light by the wavelength conversion material, and a part of the second color light is propagated towards the dichroic film and is reflected back to the first color wheel element by the dichroic film to enter the light uniforming element; at the second timing, after the first color light passes through the solid structure of the transparent substrate and the dichroic film, the first color light is transmitted to the non-wavelength conversion region of the first color wheel element, and the first color light passes through the non-wavelength conversion region of the first color wheel element and maintains its original color to enter the light uniforming element. In other words, the first color light and the second color light are transmitted to the same light uniforming element at different timings, and it is unnecessary to additionally configure an optical component for only transmitting the first color light passing through the first color wheel element. Therefore, the projection apparatus and the illumination system have a small volume, a reduced number of optical components and reduced cost.

Moreover, the light guide element located between the excitation light source and the first color wheel element includes the transparent substrate and the dichroic film disposed on the transparent substrate. The first color light emitted by the excitation light source is transmitted to the first color wheel element after passing through the solid structure of the transparent substrate and the dichroic film. In other words, the light guide element does not have a hole or a notch, so that the structure thereof is simple and is easy to be manufactured.

Moreover, since the light guide element does not have a hole or a notch, an area of a light spot of the excitation light source passing through the light guide element is not limited by a hole size, and more excitation light sources may be configured to improve the light intensity of the illumination light and the brightness of the projection image.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents. Moreover, any embodiment of or the claims of the invention is unnecessary to implement all advantages or features disclosed by the invention. Moreover, the abstract and the name of the invention are only used to assist patent searching. Moreover, "first", "second", etc. mentioned in the specification and the claims are merely used to name the elements and should not be regarded as limiting the upper or lower bound of the number of the components/devices.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. An illumination system, comprising:
an excitation light source, configured to emit a first color light, wherein the first color light is an excitation light;
a transparent substrate, disposed in a transmission path of the first color light;
a dichroic film, disposed on the transparent substrate;
a first color wheel element, having a first side and a second side opposite to each other, wherein the first color wheel element comprises at least one wavelength conversion material, and the transparent substrate and the dichroic film are disposed at the first side of the first color wheel element;

a light uniforming element, disposed at the second side of the first color wheel element;

wherein the first color light passes through an solid structure of the transparent substrate and the dichroic film, and is transmitted to the first color wheel element, and is converted into a second color light by the at least one wavelength conversion material of the first color wheel element, a first part of the second color light is transmitted towards the dichroic film, and is reflected back to the first color wheel element by the dichroic film to enter the light uniforming element, and a second part of the second color light passes through the first color wheel element and is transmitted to the light uniforming element.

2. The illumination system as claimed in claim 1, wherein the dichroic film has a spherical surface and a center of sphere of the spherical surface is located on the first color wheel element, and the first part of the second color light is reflected by the spherical surface of the dichroic film for converging to the first color wheel element.

3. The illumination system as claimed in claim 2, wherein the spherical surface of the dichroic film is a part of a complete sphere.

4. The illumination system as claimed in claim 1, wherein the transparent substrate has a light incident surface and a light emitting surface opposite to each other, the transparent substrate has a continuously varied thickness between the light incident surface and the light emitting surface, the excitation light source has a main optical axis, and a distance between the light incident surface and the light emitting surface in the main optical axis is a center thickness of the transparent substrate; wherein the center thickness is greater than an edge thickness of the transparent substrate, or the edge thickness is greater than the center thickness.

5. The illumination system as claimed in claim 1, wherein the transparent substrate has a light incident surface and a light emitting surface opposite to each other, the transparent substrate has a continuously varied thickness between the light incident surface and the light emitting surface, the excitation light source has a main optical axis, and a distance between the light incident surface and the light emitting surface in the main optical axis is a center thickness of the transparent substrate, and a ratio of the center thickness to an edge thickness of the transparent substrate ranges between 0.25 and 4.

6. The illumination system as claimed in claim 1, wherein the transparent substrate has a light incident surface protruding towards the excitation light source, the first color light is incident on a point of the light incident surface, and a tangent line of the light incident surface passing through the point and the first color light have an included angle θ there between, and θ≥70°.

7. The illumination system as claimed in claim 1, wherein the first color wheel element comprises a transparent substrate, the transparent substrate has at least one filter region, and the at least one wavelength conversion material is disposed on the at least one filter region of the transparent substrate, wherein a light having a first wavelength range of the second color light coming from the at least one wavelength conversion material passes through the at least one filter region of the transparent substrate, and a light having other wavelength of the second color light is absorbed by the at least one filter region.

8. The illumination system as claimed in claim 1, further comprising:

a second color wheel element, disposed at the second side of the first color wheel element, wherein a light having a first wavelength range of the second color light coming from the at least one wavelength conversion material passes through the second color wheel element.

9. The illumination system as claimed in claim 8, wherein the light uniforming element is disposed between the first color wheel element and the second color wheel element, and the light uniforming element guides the first color light and the second color light passing through the first color wheel element to the second color wheel element.

10. The illumination system as claimed in claim 8, further comprising:

a lens group, disposed between the first color wheel element and the second color wheel element, the second color wheel element being located between the lens group and the light uniforming element, wherein the lens group guides the first color light and the second color light passing through the first color wheel element to the second color wheel element.

11. The illumination system as claimed in claim 1, wherein the first color wheel element has at least one wavelength conversion region and at least one non-wavelength conversion region, and the illumination system further comprises:

an auxiliary light source, configured to emit an auxiliary light, wherein a wavelength range of the auxiliary light is different to a wavelength range of the first color light;

at a first timing, the first color light is propagated to the at least one wavelength conversion region of the first color wheel element and is converted into the second color light, and the auxiliary light passes through the solid structure of the transparent substrate, the dichroic film and the at least one wavelength conversion region of the first color wheel element to enter the light uniforming element;

at a second timing, the first color light passes through the solid structure of the transparent substrate, the dichroic film and the at least one non-wavelength conversion region of the first color wheel element to enter the light uniforming element, and the auxiliary light source is disabled.

12. The illumination system as claimed in claim 1, wherein the first color element has at least one wavelength conversion region and at least one non-wavelength conversion region, and the at least one wavelength conversion material is disposed on the at least one wavelength conversion region;

the first color light passing through the solid structure of the transparent substrate and the dichroic film is propagated to the at least one wavelength conversion region of the first color wheel element at a first timing, and passes through the at least one non-wavelength conversion region of the first color wheel element at a second timing.

13. A projection apparatus, comprising:

the illumination system as claimed in claim 1, wherein the illumination system is configured to provide an illumination light, and the illumination light comprises the first color light and at least a part of the second color light;

a light valve, configured to receive the illumination light, and converting the illumination light into an image light; and a projection lens, disposed in a transmission path of the image light.

14. The projection apparatus as claimed in claim 13, wherein the dichroic film has a spherical surface and a center of sphere of the spherical surface is located on the first color wheel element, and the first part of the second color light is reflected by the spherical surface of the dichroic film for converging to the first color wheel element.

15. The projection apparatus as claimed in claim 14, wherein the spherical surface of the dichroic film is a part of a complete sphere.

16. The projection apparatus as claimed in claim 13, wherein the transparent substrate has a light incident surface and a light emitting surface opposite to each other, the transparent substrate has a continuously varied thickness between the light incident surface and the light emitting surface, the excitation light source has a main optical axis, and a distance between the light incident surface and the light emitting surface in the main optical axis is a center thickness of the transparent substrate; wherein the center thickness is greater than an edge thickness of the transparent substrate, or the edge thickness is greater than the center thickness.

17. The projection apparatus as claimed in claim 13, wherein the transparent substrate has a light incident surface and a light emitting surface opposite to each other, the transparent substrate has a continuously varied thickness between the light incident surface and the light emitting surface, the excitation light source has a main optical axis, and a distance between the light incident surface and the light emitting surface in the main optical axis is a center thickness of the transparent substrate, and a ratio of the center thickness to an edge thickness of the transparent substrate ranges between 0.25 and 4.

18. The projection apparatus as claimed in claim 13, wherein the transparent substrate has a light incident surface protruding towards the excitation light source, the first color light is incident on a point of the light incident surface, and a tangent line of the light incident surface passing through the point and the first color light have an included angle θ there between, and θ≥70°.

19. The projection apparatus as claimed in claim 13, wherein the first color wheel element comprises a transparent substrate, the transparent substrate has at least one filter region, and the at least one wavelength conversion material is disposed on the at least one filter region of the transparent substrate, wherein a light having a first wavelength range of the second color light coming from the at least one wavelength conversion material passes through the at least one filter region of the transparent substrate, and a light having other wavelength of the second color light is absorbed by the at least one filter region.

20. The projection apparatus as claimed in claim 13, wherein the illumination system further comprises:
a second color wheel element, disposed at the second side of the first color wheel element, wherein a light having a first wavelength range of the second color light coming from the at least one wavelength conversion material passes through the second color wheel element.

21. The projection apparatus as claimed in claim 20, wherein the light uniforming element is disposed between the first color wheel element and the second color wheel element, and the light uniforming element guides the first color light and the second color light passing through the first color wheel element to the second color wheel element.

22. The projection apparatus as claimed in claim 20, further comprising:
a lens group, disposed between the first color wheel element and the second color wheel element, the second color wheel element being located between the lens group and the light uniforming element, wherein the lens group guides the first color light and the second color light passing through the first color wheel element to the second color wheel element.

23. The projection apparatus as claimed in claim 13, wherein the first color wheel element has at least one wavelength conversion region and at least one non-wavelength conversion region, and the illumination system further comprises:
an auxiliary light source, configured to emit an auxiliary light, wherein a wavelength range of the auxiliary light is different to a wavelength range of the first color light;
at a first timing, the first color light is propagated to the at least one wavelength conversion region of the first color wheel element and is converted into the second color light, and the auxiliary light passes through the solid structure of the transparent substrate, the dichroic film and the at least one wavelength conversion region of the first color wheel element to enter the light uniforming element;
at a second timing, the first color light passes through the solid structure of the transparent substrate, the dichroic film and the at least one non-wavelength conversion region of the first color wheel element to enter the light uniforming element, and the auxiliary light source is disabled.

24. The projection apparatus as claimed in claim 13, wherein the first color element has at least one wavelength conversion region and at least one non-wavelength conversion region, and the at least one wavelength conversion material is disposed on the at least one wavelength conversion region; the first color light passing through the solid structure of the transparent substrate and the dichroic film is propagated to the at least one wavelength conversion region of the first color wheel element at a first timing, and passes through the at least one non-wavelength conversion region of the first color wheel element at a second timing.

* * * * *